United States Patent
Brown et al.

(10) Patent No.: US 9,830,419 B2
(45) Date of Patent: Nov. 28, 2017

(54) MODIFYING IMPLANT REGIONS IN AN INTEGRATED CIRCUIT TO MEET MINIMUM WIDTH DESIGN RULES

(71) Applicant: NVIDIA CORPORATION, Santa Clara, CA (US)

(72) Inventors: David Lyndell Brown, Austin, TX (US); Sreedhar Pratty, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 239 days.

(21) Appl. No.: 14/744,016

(22) Filed: Jun. 18, 2015

(65) Prior Publication Data

US 2016/0371421 A1    Dec. 22, 2016

(51) Int. Cl.
*G06F 17/50* (2006.01)
(52) U.S. Cl.
CPC .............................. *G06F 17/5081* (2013.01)
(58) Field of Classification Search
CPC .................... G06F 17/5082; G06F 17/5081

USPC .......................................................... 716/113
See application file for complete search history.

(56) References Cited

U.S. PATENT DOCUMENTS

| 6,418,551 | B1 * | 7/2002 | McKay et al. ................. 716/112 |
| 2011/0258588 | A1 * | 10/2011 | Sharma ............... G06F 17/5072 716/108 |
| 2012/0061764 | A1 * | 3/2012 | Lum et al. ..................... 257/368 |
| 2014/0019932 | A1 * | 1/2014 | Griesbach et al. ........... 716/122 |

* cited by examiner

*Primary Examiner* — Suchin Parihar
(74) *Attorney, Agent, or Firm* — Artegis Law Group, LLP

(57) ABSTRACT

A computer-implemented method for designing an integrated circuit includes determining a timing slack associated with a first cell of the integrated circuit that is physically adjacent to a second cell of the integrated circuit, the second cell including an implant region that is in violation of an implant width design rule associated with the integrated circuit, determining that the timing slack is greater than a change in timing slack associated with expanding the implant region into the first cell, and, in response, expanding the implant region from first cell into the second cell to form a larger implant region.

22 Claims, 6 Drawing Sheets

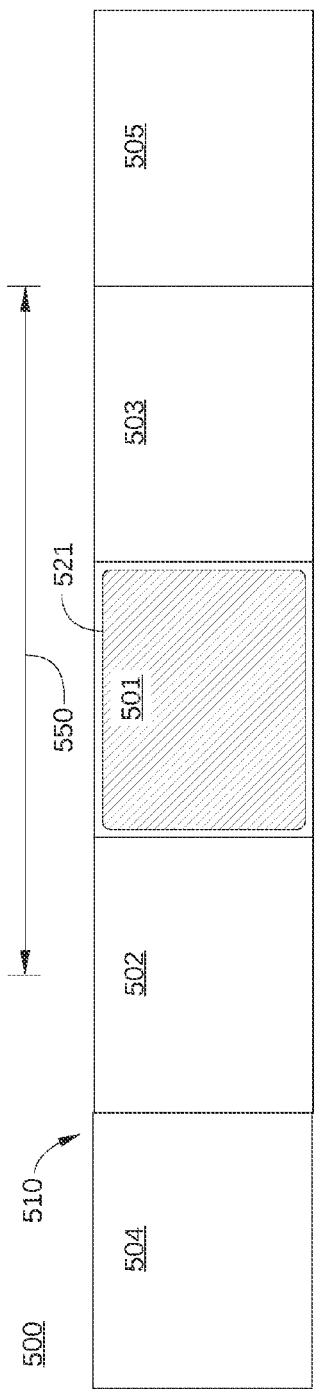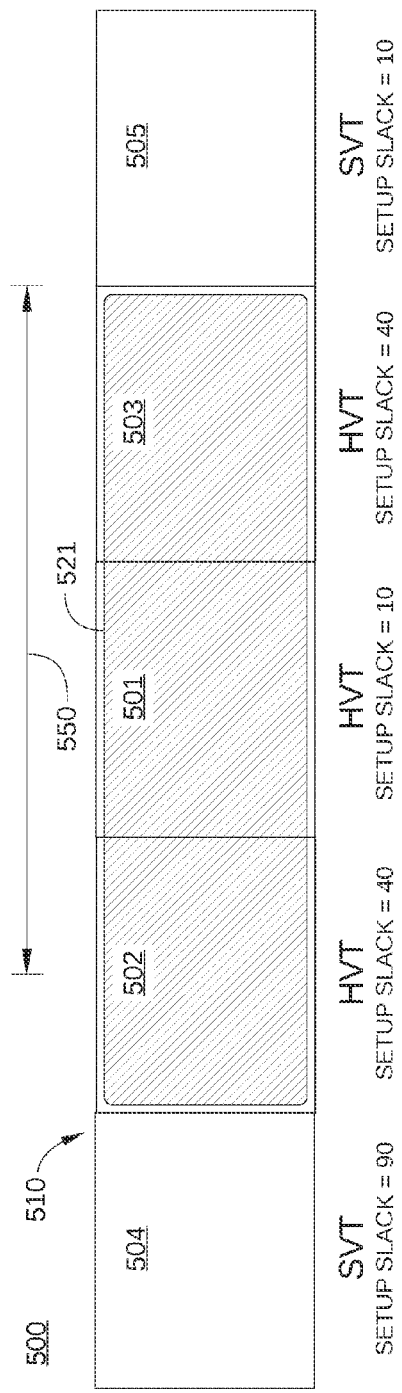

MODIFYING IMPLANT REGIONS IN AN INTEGRATED CIRCUIT TO MEET MINIMUM WIDTH DESIGN RULES

BACKGROUND OF THE INVENTION

Field of the Invention

The present invention relates generally to integrated circuit (IC) design and, more specifically, to modifying implant regions in an integrated circuit to meet minimum width design rules.

Description of the Related Art

In modern, very large scale integration (VLSI) manufacturing processes, basic logic gates or "cells," such as AND gates, OR gates, and NOT gates as well as other basic logic gates may be implemented with a variety of speed and power consumption characteristics. The trade-off between the speed and power use of a particular cell is typically accomplished by adjusting the threshold voltage of the transistors that comprise the logic gates, where the threshold voltage is the minimum gate-to-source voltage differential that is needed to create a conducting path between the source and drain terminals of the transistor. Because threshold voltage is a function of dopant ion concentration, threshold voltage for a particular cell may be set by implanting particular elements during manufacturing.

However, in certain manufacturing processes, such as those associated with the 20 nm IC process node, there is a minimum width allowed for implant regions that can be larger than one or more dimension of the implant region associated with a single cell. Consequently, a single cell in an IC that has a different implant property than adjacent cells may not be "manufacturable," unless relocated within the IC to a location adjacent to a cell or cells having the same implant property. Cell relocation is problematic in the IC design process because relocating a given cell disturbs the already established routing of the IC design. Any changes to routing may adversely impact the overall design schedule of the IC and potentially impact timing and performance of the IC design.

As the foregoing illustrates, there is a need in the art for more effective techniques for achieving minimum width layout requirements for implant regions in an integrated circuit.

SUMMARY OF THE INVENTION

One embodiment of the present invention sets forth a computer-implemented method for designing an integrated circuit. The method includes determining a timing slack associated with a first cell of the integrated circuit that is physically adjacent to a second cell of the integrated circuit, the second cell including an implant region that is in violation of an implant width design rule associated with the integrated circuit, determining that the timing slack is greater than a change in timing slack associated with expanding the implant region into the first cell, and, in response, expanding the implant region from first cell into the second cell to form a larger implant region.

At least one advantage of the disclosed techniques is that minimum width implant violations can be addressed in an IC design without relocating the violating cell, thereby reducing the amount of time required to complete the IC design process, and, in some cases, improving the performance of the final IC design.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5A is a schematic diagram of yet another portion of an IC design before being modified.

FIG. 5B is a schematic diagram of the portion of the IC design in FIG. 5A after being modified, according to yet another embodiment of the invention.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
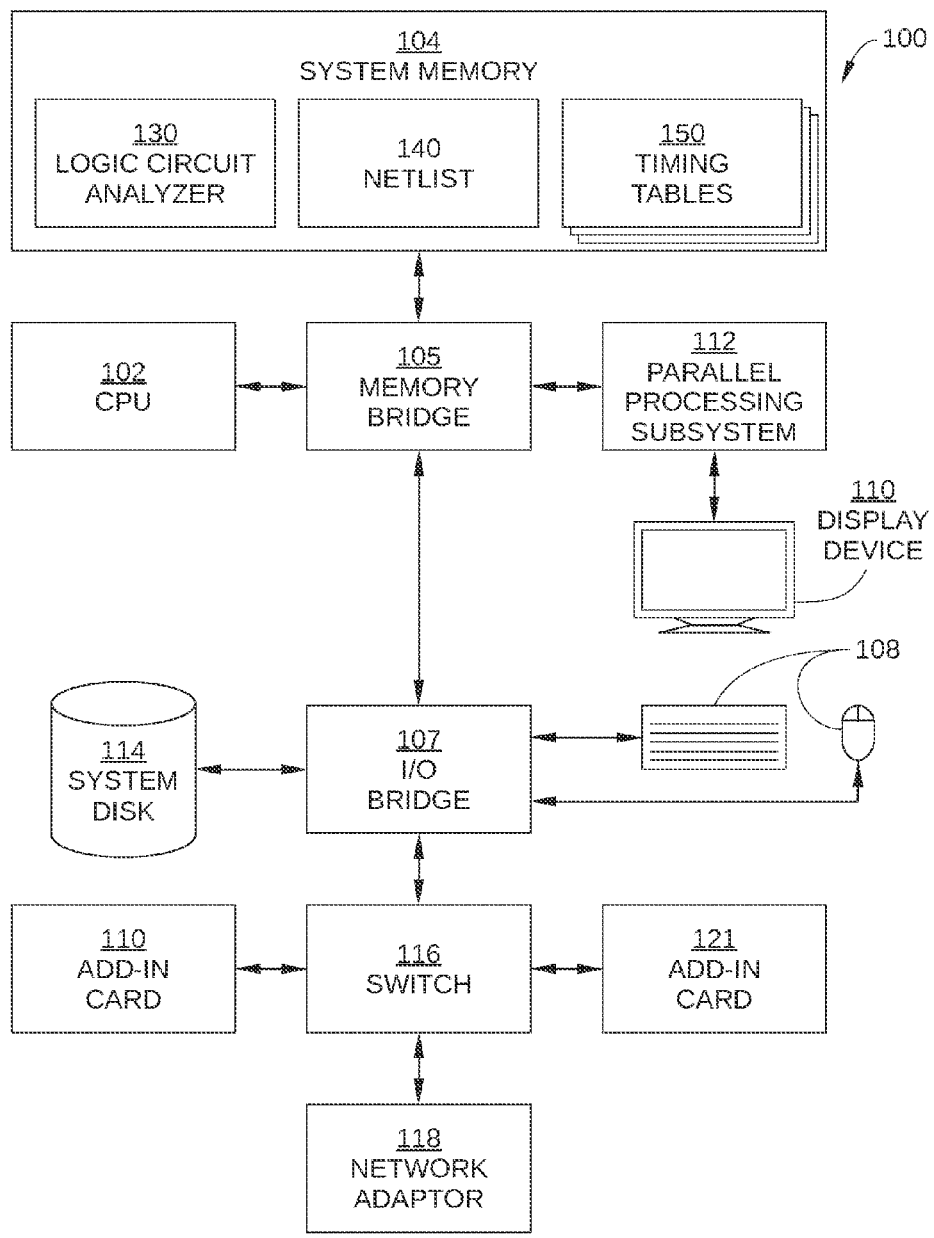
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

System memory 104 includes at least one device driver configured to manage the processing operations of the one or more PPUs within parallel processing subsystem 112. In addition, system memory 104 includes a logic circuit analyzer 130, a netlist 140, and timing tables 150. Logic circuit analyzer 130 may be implemented as a set of program instructions loaded in system memory 104 that may be executed by CPU 102. Logic circuit analyzer 130, netlist 140, and timing tables 150 are described in greater detail below.

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 is connected to CPU 102 directly rather than through memory bridge 105, and other devices communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 may be eliminated, and network adapter 118 and add-in cards 120, 121 connect directly to I/O bridge 107.

Logic circuit analyzer 130 is configured to correct minimum width violations of implant regions in an IC design. Specifically, logic circuit analyzer detects violating cells, determines timing margins for the violating cells and cells adjacent thereto, and modifies an implant region associated with the violating cell or one or more adjacent cells to correct the minimum width violation. Generally, a violating cell is any cell that includes an implant region violating minimum width rules for the IC design. Adjacent cells include cells physically proximate to but electrically isolated from the violating cell in the IC, such as a cell physically adjacent to the violating cell in the IC but included in a different timing path than the violating cell.

Netlist 140 includes a circuit netlist representing a particular IC design to be realized in physical form. Thus, netlist 140 may include, without limitation, the connectivity of every instance of the various devices making up the IC design of interest. Timing tables 150 include, without limitation, timing margins for the devices of an IC design included in netlist 140. For example, a timing table 150 may include timing slack entries, such as setup slack and hold slack, for every logic gate in the IC design, as determined by a static timing analysis tool. The setup slack for a particular device in an IC design indicates how much slower the device can operate before being too slow to meet design goals. The hold slack for a particular device indicates how much faster the device can operate before output from the device can fail to be accurately received. In some embodiments only a single timing table 150 may be employed. In other embodiments, multiple timing tables 150 are employed, each associated with a different combination of voltage, temperature, and other operating conditions the IC design is expected to operate under. In some embodiments, variations in manufacturing characteristics of the IC design may also be a factor associated with one or more of timing tables 150. Each timing table 150 includes timing margins for the different pins or timing paths of the IC design included in netlist 140. In some embodiments, timing tables 150 are generated by logic circuit analyzer 130. Alternatively, timing tables 150 are generated by any other suitable algorithm, software application, or process.

Figure 2A:
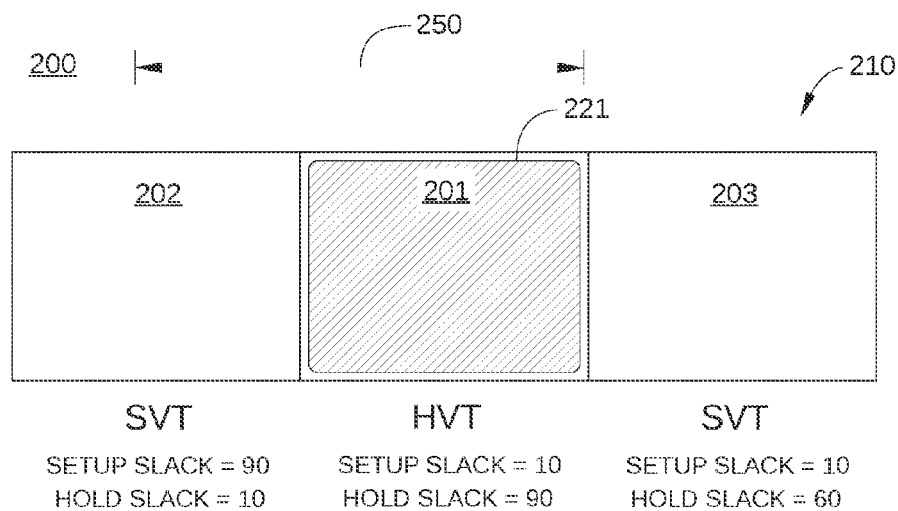
FIG. 2A is a schematic diagram of a portion of an IC design before being modified.

FIG. 2A is a schematic diagram of a portion 210 of an IC design 200 before being modified according to one embodiment of the invention. Portion 210 includes a violating cell 201 of IC design 200 and adjacent cells 202 and 203 of IC design 200. For clarity, IC portion 210 is illustrated with three cells, but may include more. Violating cell 201 and adjacent cells 202 and 203 may each be any logic cell or other collection of transistors employed as a standard cell in IC design 200.

Violating cell 201 is a cell in IC design 200 configured as a high threshold voltage (HVT) cell. HVT cells are normally associated with slower cells that consume less power than standard threshold voltage (SVT) cells in IC design 200. For example, violating cell 201 may be selected to be an HVT cell to reduce power use of IC design 200 and/or to slow the timing of portion 210. To have the properties of an HVT cell, violating cell 201 includes a suitable implant region 221. Violating cell 201 is considered a violating cell because implant region 221 does not satisfy a minimum width 250 required of implant regions in IC design 200, and therefore cannot be formed reliably during the IC manufacturing process.

Adjacent cells 202 and 203 are cells in IC design 200 configured as SVT cells, and therefore do not include an implant region. Adjacent cell 202 and adjacent cell 203 are each physically proximate or adjacent to violating cell 201. However, adjacent cell 202 and adjacent cell 203 may not be electrically adjacent in IC design 200 to violating cell 201. For example, in some embodiments, no output of adjacent cell 202 or adjacent cell 203 corresponds to an input of violating cell 201, and no output of violating cell 201 corresponds to an input of either adjacent cell 202 or adjacent cell 203. Furthermore, in some embodiments, for a cell to be considered adjacent to violating cell 201, the cell in question may be even further isolated from violating cell 201. For example, in some embodiments, adjacent cell 202 or adjacent cell 203 are not included in the same timing path as violating cell 201.

In the embodiment illustrated in FIG. 2A, violating cell 201 has relatively low setup slack (i.e., 10 timing units) and a relatively high hold slack (i.e., 90 timing units). Thus, violating cell 201 can be modified to operate more quickly without output from violating cell 201 being inaccurately received, but cannot be modified to operate significantly more slowly. In addition, adjacent cell 202 has a setup slack of 90 timing units and a hold slack of 10 timing units, while adjacent cell 203 has a setup slack of 10 timing units and a hold slack of 60 timing units. It is noted that the timing units referenced herein may be any suitable unit of time applicable for use in the design of IC 200, such as picoseconds, nanoseconds, and the like, and the timing margins illustrated are for purposes of illustration only.

As noted, violating cell 201 violates minimum width 250 for implant regions in IC design 200, indicating that violating cell 201 cannot be reliably manufactured. However, relocation of violating cell 201 elsewhere within IC design 200 is problematic; the resulting rerouting can adversely impact the overall design schedule and in some cases the performance of IC design 200. According to some embodiments of the present invention, rather than relocating violating cell 201 within IC design 200, logic circuit analyzer 130 is configured to correct the minimum width violation associated with implant region 221 by removing or modifying implant region 221, as described below in conjunction with FIGS. 2-6.

Figure 2B:
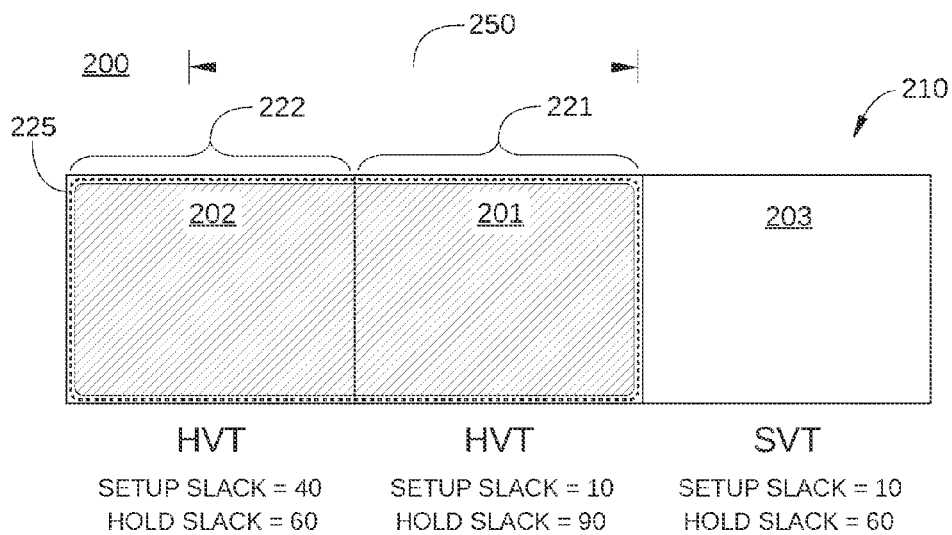
FIG. 2B is a schematic diagram of the portion of the IC design in FIG. 2A after being modified, according to one embodiment of the invention.

FIG. 2B is a schematic diagram of portion 210 of IC design 200 after being modified according to one embodiment of the invention. As shown, adjacent cell 202 has been replaced with a slower HVT cell otherwise having the same functionality, and now includes an implant region 222. Consequently, the setup slack of adjacent cell 202 is reduced from 90 timing units to 40 timing units and the hold slack of adjacent cell 202 is increased from 10 timing units to 60 timing units. Thus, because the setup slack of adjacent cell 202 was determined to be sufficient (e.g., 90 timing units) to absorb the reduced speed associated with being an HVT cell (e.g., 50 timing units), adjacent cell 202 operates without adversely affecting the timing of IC design 200, despite being changed from an SVT cell to an HVT cell. By contrast, assuming in this instance that the change in slack associated with converting from an SVT cell to an HVT cell is on the order of about 50 timing units, adjacent cell 203 has insufficient setup slack (e.g., only 10 timing units) to operate correctly if replaced with a slower HVT cell.

Because implant region 222 of adjacent cell 202 is contiguous with implant region 221 of violating cell 201, a single larger implant region 225 is formed that does not violate minimum width requirement 250. Consequently, implant region 225 is manufacturable. Thus, by expanding implant region 221 to implant region 225 to change adjacent cell 202 from an SVT cell to an HVT cell, minimum width requirement 250 is satisfied without relocating any cells of IC design 200. Furthermore, an additional benefit associated with changing adjacent cell 202 from an SVT cell to an HVT cell is that the configuration of portion 210 illustrated in FIG. 2B has lower leakage power than the configuration of portion 210 illustrated in FIG. 2A.

In an alternative embodiment, violating cell 201 may be changed from an HVT cell to an SVT cell, to remove the violation of minimum width requirement 250. In such an embodiment, implant region 221 is removed. Because the hold slack of violating cell 201 (90 timing units) is sufficient to accommodate the faster operation associated with violating cell 201 being converted to an SVT cell, violating cell 201 can operate without adversely affecting the timing of IC design 200, despite being changed from an HVT cell to an SVT cell. However, changing violating cell 201 to an HVT cell results in greater power use than the configuration illustrated in FIG. 2B, and is therefore less beneficial.

For simplicity, the slower operation associated with violating cell 201 being converted to an SVT cell and the faster operation associated with adjacent cell 202 being converted to an HVT cell are assumed herein to require slack of approximately 50 timing units. In practice, determining how much slack is sufficient for a cell to be changed from and HVT cell to an SVT cell, and vice-versa, may be calculated using a variety of timing estimation methods known in the art.

Figure 3A:
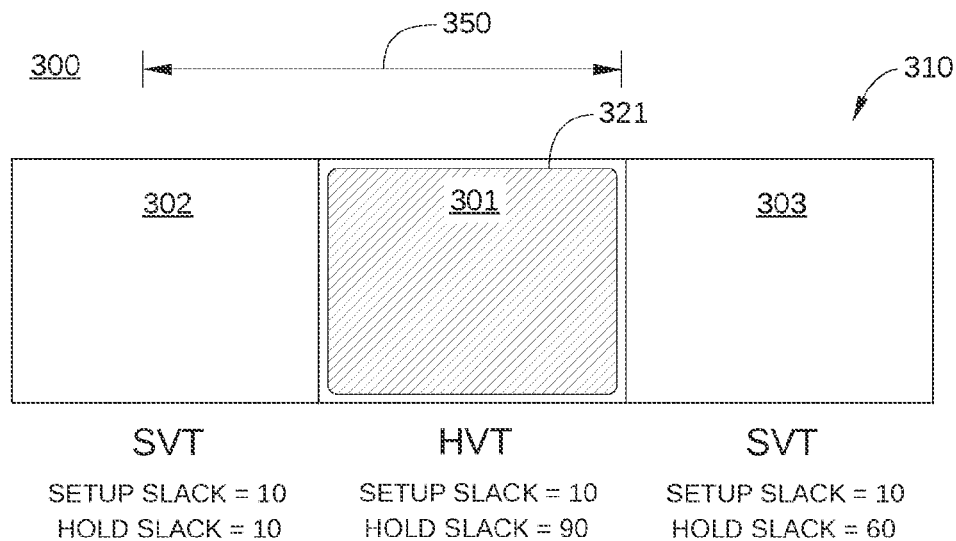
FIG. 3A is a schematic diagram of another portion of an IC design before being modified.
Figure 3B:
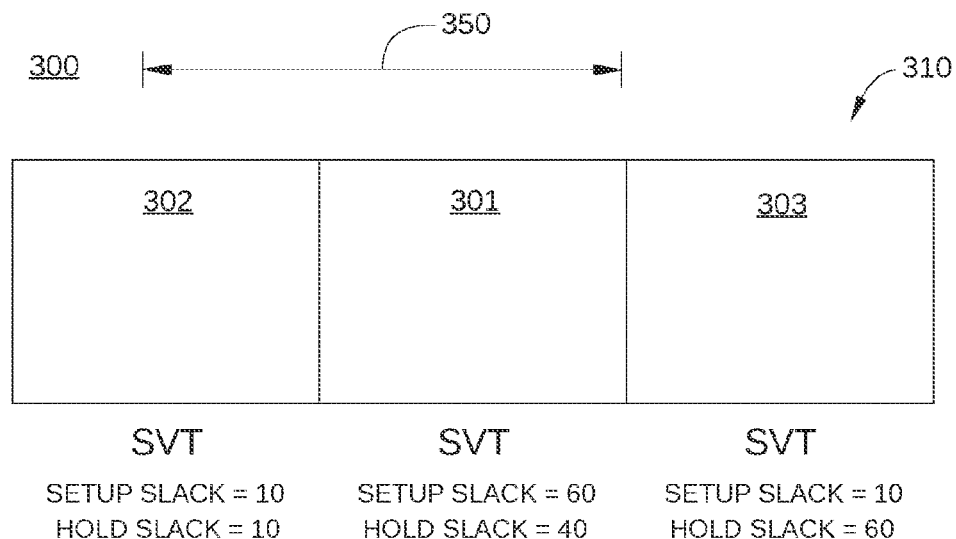
FIG. 3B is a schematic diagram of the portion of the IC design in FIG. 3A after being modified, according to another embodiment of the invention.

FIG. 3A is a schematic diagram of a portion 310 of an IC design 300 before being modified according to an embodiment of the invention, and FIG. 3B is a schematic diagram of portion 310 after being modified according to the embodiment of the invention. Portion 310 includes a violating cell 301 and adjacent cells 302 and 303. Violating cell 301 and adjacent cells 302 and 303 may each be any logic cell or other collection of transistors employed as a standard cell in IC design 300.

Violating cell 301 is a cell in IC design 300 configured as an HVT cell with an implant region 321 that does not satisfy a minimum width 350 required of implant regions in IC design 300. Adjacent cells 302 and 303 are cells in IC design 300 configured as SVT cells, and therefore do not include an implant region. Similar to violating cell 201 in FIGS. 2A and 2B, violating cell 301 has a setup slack of 10 timing units and a hold slack of 90 timing units. Thus, violating cell 301 can be modified to operate more quickly without output from violating cell 301 being inaccurately received, but cannot be modified to operate significantly more slowly. However, unlike adjacent cell 202 in FIG. 2A, adjacent cell 302 only has a setup slack of 10 timing units and a hold slack of 10 timing units, and therefore cannot be replaced with a slower HVT cell without adversely affecting the timing of IC design 200. Instead, violating cell 301 is replaced with a faster SVT cell (as shown in FIG. 3B), which has no implant region associated therewith. Consequently, the hold slack of violating cell 301 is reduced to 40 timing units and the setup slack of violating cell 301 is increased to 60 timing units.

In some embodiments, a violating cell in an IC design is configured as a low voltage threshold (LVT) cell, which is a version of cell that is typically faster and consumes more power than an equivalent SVT cell. In such embodiments, an implant region associated with the violating LVT cell is either modified or removed to satisfy a minimum width requirement. One such embodiment is illustrated in FIGS. 4A and 4B.

Figure 4A:
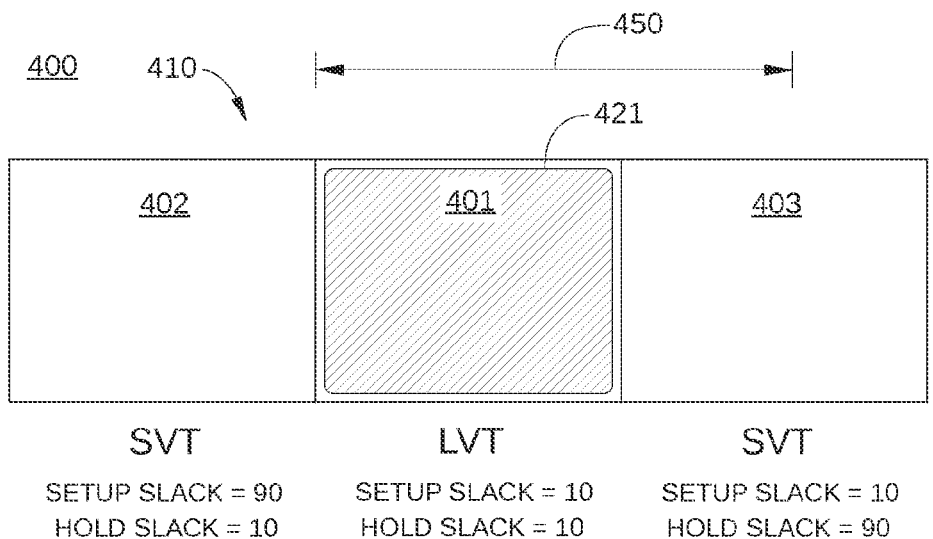
FIG. 4A is a schematic diagram of yet another portion of an IC design before being modified.
Figure 4B:
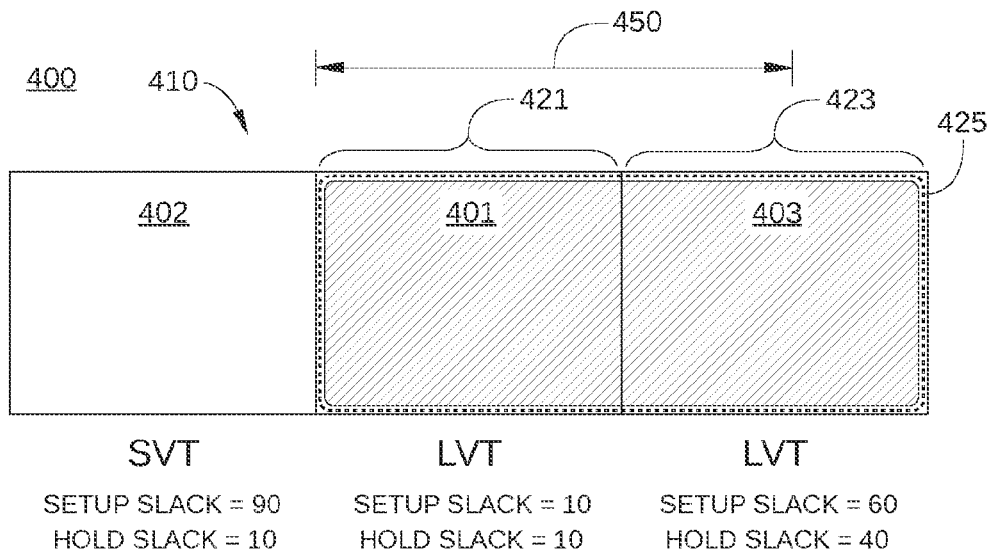
FIG. 4B is a schematic diagram of the portion of the IC design in FIG. 4A after being modified, according to yet another embodiment of the invention.

FIG. 4A is a schematic diagram of a portion 410 of an IC design 400 before being modified according to an embodiment of the invention, and FIG. 4B is a schematic diagram of portion 410 after being modified according to the embodiment of the invention. Portion 410 includes a violating cell 401 and adjacent cells 402 and 403. Violating cell 401 includes an associated implant region 421 that fails to meet a minimum width requirement 450. As shown, violating cell 401 initially has a setup slack of 10 timing units and a hold slack of 10 timing units, adjacent cell 402 has a setup slack of 90 timing units and a hold slack of 10 timing units, and adjacent cell 403 has a setup slack of 10 timing units and a hold slack of 90 timing units. Because adjacent cell 402 has such small hold slack, adjacent cell 402 cannot be changed to a faster LVT cell to increase the size of implant region 421. However, adjacent cell 403 initially has sufficient hold slack (i.e., 90 timing units) for adjacent cell 403 to be changed to a faster LVT cell without adversely affecting timing of IC design 400. Therefore, as depicted in FIG. 4B, adjacent cell 403 is changed from an SVT cell to a faster LVT cell that includes an implant region 423 but otherwise has the same functionality, and the setup slack and hold slack of adjacent cell 403 change accordingly. Because implant region 422 of adjacent cell 202 is contiguous with implant region 421 of violating cell 201, a single larger implant region 425 is formed that does not violate minimum width requirement 450. Consequently, implant region 401 is manufacturable.

In some embodiments, the expansion of an implant region associated with a violating cell into a single adjacent cell may not satisfy a minimum width requirement. In such embodiments, the implant region of the violating cell may be expanded into multiple adjacent cells to create an implant region that satisfies the minimum width requirement. One such embodiment is illustrated in FIGS. 5A and 5B.

FIG. 5A is a schematic diagram of a portion 510 of an IC design 500 before being modified according to an embodiment of the invention, and FIG. 5B is a schematic diagram of portion 510 after being modified according to the embodiment of the invention. Portion 510 includes a violating cell 501 and adjacent cells 502-505. Violating cell 501 includes an associated implant region 521 that fails to meet a minimum width 550. As illustrated in FIG. 5A, expansion of implant region 521 into either adjacent cell 502 or adjacent cell 503 will not create an implant region that satisfies minimum width 550. However, expansion of implant region 521 into multiple adjacent cells will create an implant region that does satisfy minimum width 550. For example, such an implant region is created by expanding implant region 521 into adjacent cells 502 and 503, or into adjacent adjacent cells 503 and 505, or into adjacent cells 502 and 504.

As described above in conjunction with other embodiments, expansion of implant region 521 into adjacent cells converts these adjacent cells to a different type of cell. In the embodiment illustrated in FIGS. 5A-5B, the adjacent SVT cells are converted to slower HVT cells. Therefore, to avoid adversely affecting the timing of IC design 500, adjacent cells selected for such conversion are cells that have sufficient setup slack to operate correctly if replaced with a slower HVT cell of otherwise equivalent functionality. In the embodiment illustrated in FIG. 5A, only adjacent cells 502 and 503 have sufficient setup slack. Consequently, in this embodiment, implant region 521 is expanded into adjacent cells 502 and 503, as shown in FIG. 5B. It is noted that in embodiments in which violating cell 501 is configured as an LVT cell, the adjacent cells into which implant region 521 is expanded should have sufficient hold slack (rather than setup slack). This is because these adjacent cells are converted to faster LVT cells, and sufficient hold slack is needed in these cells to prevent the timing of IC design 500 from being adversely affected by such conversion.

Figure 6:
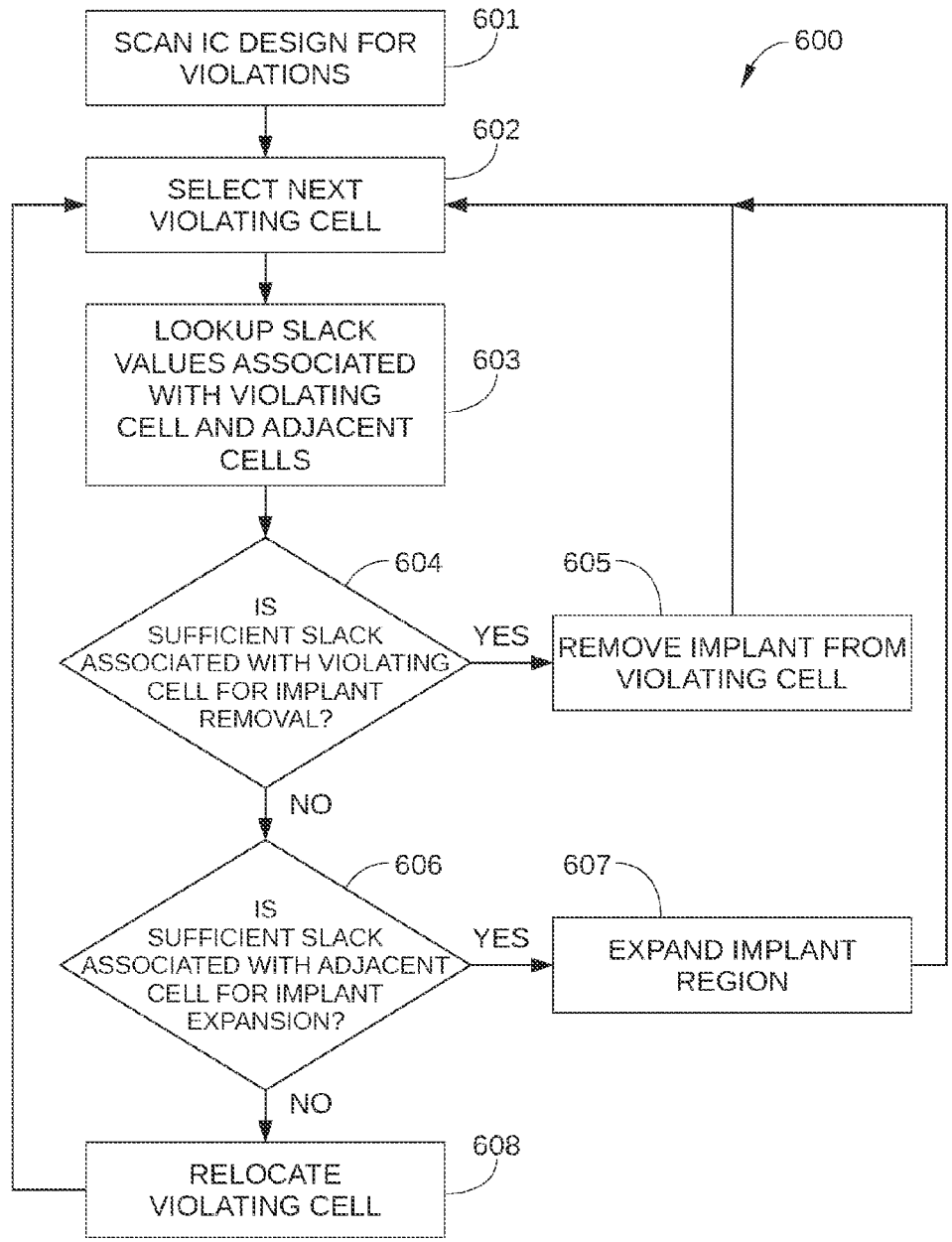
FIG. 6 is a flowchart of method steps for modifying implant regions in an integrated circuit to meet minimum width design rules, according to one embodiment of the present invention.

FIG. 6 is a flowchart of method steps for modifying implant regions in an integrated circuit to meet minimum width design rules, according to one embodiment of the present invention. Although the method steps are described in conjunction with the systems of FIGS. 1-5B, persons skilled in the art will understand that any system configured to perform the method steps, in any order, is within the scope of the present invention.

In some embodiments, prior to the method steps, logic circuit analyzer 130 scans netlist 140 of a particular IC design for cells that violate minimum width rules for implant regions. In addition, in some embodiments, logic circuit analyzer 130 or any other suitable software application may generate one or more timing tables 150 for netlist 140.

As shown, a method 600 begins at step 601, where logic circuit analyzer 130 scans an IC design of interest for violating cells, i.e., cells that include an implant that violates a minimum width requirement of the IC design. In step 602, logic circuit analyzer 130 selects one of the violating cells detected in step 601 for modification.

In step 603, logic circuit analyzer 130 looks up slack values associated with the selected violating cell and cells that are physically adjacent to the violating cell. The slack values may include setup slack and hold slack associated with each of these cells. In embodiments in which a plurality of timing tables are associated with the IC design, multiple timing tables or all of these timing tables may be considered simultaneously in step 603 when looking up slack values.

In step 604, logic circuit analyzer 130 determines whether there is sufficient slack associated with the violating cell for removal of the implant region associated with the violating cell. For example, in an embodiment in which the violating cell is an HVT cell, logic circuit analyzer 130 determines whether there is sufficient hold slack associated with the violating cell to accommodate removal of the implant region without adversely affecting timing of the IC design. Conversely, in an embodiment in which the violating cell is an LVT cell, logic circuit analyzer 130 determines whether there is sufficient setup slack associated with the violating cell for the implant region to be removed. If yes, method 600 proceeds to step 605; if no, method 600 proceeds to step 606.

In step 605, logic circuit analyzer 130 removes the implant region from the violating cell and method 600 proceeds back to step 602, where the next violating cell detected in step 601 is selected.

In step 606, logic circuit analyzer 130 determines whether there is sufficient slack associated with any adjacent cell for expansion of the implant region associated with the violating cell. For example, in an embodiment in which the violating cell is an HVT cell, logic circuit analyzer 130 determines whether there is sufficient setup slack associated with an adjacent SVT cell to accommodate the addition of an implant region in the adjacent SVT cell without adversely affecting timing of the IC design. That is, logic circuit analyzer 130 determines whether the adjacent SVT cell can be converted to an HVT cell without adversely affecting timing of the IC design. Conversely, in an embodiment in which the violating cell is an LVT cell, logic circuit analyzer 130 determines whether there is sufficient hold slack associated with the adjacent cell to accommodate the addition of an implant region in the adjacent SVT cell without adversely affecting timing of the IC design. If yes, method 600 proceeds to step 607; if no, method 600 proceeds to step 608.

In step 607, logic circuit analyzer 130 expands the implant region from the violating cell into the adjacent cell, thereby converting the adjacent cell into the same cell type (i.e., HVT or LVT) as the violating cell. Method 600 then proceeds back to step 602, where the next violating cell detected in step 601 is selected.

In step 608, logic circuit analyzer 130 relocates the violating cell, since there is no other option for correcting the minimum width rule for implant associated with the violating cell. Method 600 then proceeds back to step 602, where the next violating cell detected in step 601 is selected.

It is noted that in method 600, the priority in modifying an implant region is to remove the implant region from the violating cell rather than to expand the implant region into a physically adjacent cell. In such embodiments, impact on the overall timing of an IC design may be minimized or otherwise reduced when removing implant regions that were primarily included in an IC design to opportunistically reduce power loss. These regions can be removed from the violating cell with very little impact on the overall timing of the IC design, since such implant regions are often added to the IC design after timing margins are calculated that indicate a particular cell could be slowed down (thereby reducing leakage power of the cell) without impacting operation of the IC. Thus, removal of such an implant region simply returns the IC to a configuration previously determined to be operational.

In other embodiments of method 600, a different preference for modifying an implant region may be implemented. For example, when additional reduction in power is an objective, method 600 may be modified to prioritize conversion of SVT adjacent cells to HVT cells over reverting an HVT violating cell back to an SVT cell. In this way, the leakage power of an adjacent cell is reduced instead of the leakage power of the violating cell being increased. Similarly, converting an LVT violating cell to an SVT cell may be prioritized over converting an SVT adjacent cell to an LVT cell.

In sum, embodiments of the present invention provide systems and method for modifying implant regions in an integrated circuit to meet minimum width design rules. By modifying an implant region associated with a violating cell, a violation of a minimum width design rule by the implant region can be rectified without relocating the violating cell. For example, the implant region can be either removed or expanded into a physically adjacent cell. The decision to remove or expand the implant region may be based on timing slack values associated with the violating cell and/or the adjacent cell.

At least one advantage of the techniques described herein is that minimum width implant violations can be addressed in an IC design without relocating the violating cell, thereby speeding the IC design process, and in some cases improving the performance of the final IC design.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable medium storing instructions that, when executed by a processor included in a computing device, causes the computing device to control a fabrication process for an integrated circuit by performing the steps of:
   determining a timing slack associated with a first cell of the integrated circuit, the first cell including an implant region that is in violation of an implant width design rule associated with the integrated circuit;
   determining that the timing slack is greater than a change in timing slack associated with removing the implant region from the first cell; and
   in response, removing, via a logic circuit analyzer, the implant region from the first cell.

2. The non-transitory computer-readable medium of claim 1, wherein the change in timing slack comprises a change in timing slack associated with the first cell.

3. The non-transitory computer-readable medium of claim 1, wherein the first cell is included in a first time path of the integrated circuit, and the second cell is included in a second time path of the integrated circuit, and wherein the first time path is separate from the second time path.

4. The non-transitory computer-readable medium of claim 1, wherein determining the timing slack of the first cell comprises reading a timing table associated with the integrated circuit.

5. A computer-implemented method for controlling a fabrication process for an integrated circuit, the method comprising:
   determining a timing slack associated with a first cell of the integrated circuit that is physically adjacent to a second cell of the integrated circuit, the second cell including an implant region that is in violation of an implant width design rule associated with the integrated circuit;
   determining that the timing slack is greater than a change in timing slack associated with expanding the implant region into the first cell; and
   in response, expanding, via a logic circuit analyzer, the implant region from the second cell into the first cell to form a larger implant region.

6. The method of claim 5, wherein the change in timing slack comprises a change in timing slack associated with the second cell.

7. The method of claim 5, wherein the larger implant region satisfies the implant width design rule.

8. The method of claim 5, further comprising:
   in response to the timing slack being less than the change in timing slack, determining a timing slack associated with the first cell of the integrated circuit;
   determining that the timing slack associated with the first cell is greater than a change in timing slack associated with removing the implant region from the first cell; and
   in response, removing the implant region from the first cell.

9. The method of claim 5, wherein the first cell is included in a first time path of the integrated circuit, and the second cell is included in a second time path of the integrated circuit, and wherein the first time path is separate from the first time path.

10. The method of claim 5, wherein determining the timing slack of the second cell comprises reading a timing table associated with the integrated circuit.

11. The method of claim 5, wherein the first cell comprises a high threshold voltage cell of the integrated circuit, and the timing slack of the second cell comprises a setup slack.

12. The method of claim 5, wherein the first cell comprises a low threshold voltage cell of the integrated circuit, and the timing slack of the second cell comprises a hold slack.

13. The method of claim 5, wherein the larger implant region is in violation of the implant width design rule and further comprising:
   determining a timing slack of a third cell of the integrated circuit that is physically adjacent to the second cell;
   determining that the timing slack of the third cell is greater than a change in timing slack associated with expansion of the implant region into the third cell; and
   in response, expanding the implant region from second cell into the third cell to form an extended implant region.

14. The method of claim 13, wherein the extended implant region satisfies the implant width design rule.

15. A computing device configured to design an integrated circuit, including:
   a logic circuit analyzer configured to:
      determine that an implant region associated with a first cell of an integrated circuit is in violation of an implant width design rule associated with the integrated circuit;
      determine a first leakage power associated with the first cell assuming that the implant region has been removed from the first cell;
      determine a second leakage power associated with a second cell of the integrated circuit that is physically adjacent to the first cell assuming that the implant region has been expanded into the second cell;
      determine whether the first leakage power is less than the second leakage power; and
      if the first leakage power is less than the second leakage power, then remove the implant region from the first cell; or
      if the first leakage power is greater than the second leakage power, then extend the implant region into the second cell to form an extended implant region.

16. The computing device of claim 15, wherein the implant region satisfies the implant width design rule when extended into the second cell.

17. The computing device of claim 15, wherein the first cell is included in a first time path of the integrated circuit, and the second cell is included in a second time path of the integrated circuit, and wherein the first time path is separate from the first time path.

18. The computing device of claim 15, wherein determining the timing slack of the second cell comprises reading a timing table associated with the integrated circuit.

19. The computing device of claim 15, wherein the first cell comprises a high threshold voltage cell of the integrated circuit, and the second cell comprises a standard threshold voltage cell of the integrated circuit.

20. The computing device of claim 15, wherein the first cell comprises a low threshold voltage cell of the integrated circuit, and the second cell comprises a standard threshold voltage cell of the integrated circuit.

21. The non-transitory computer-readable medium of claim 1, wherein the first cell including an implant region comprises a standard cell.

22. The method of claim 5, wherein the second cell including an implant region comprises a standard cell.

* * * * *